United States Patent
Baxter

Patent Number: 5,694,760
Date of Patent: Dec. 9, 1997

[54] CUMBUSTOR LEAN FLAMEOUT CONTROL

[75] Inventor: Thomas A. Baxter, Gibsonia, Pa.

[73] Assignee: General Electric Company, Cincinnati, Ohio

[21] Appl. No.: 686,613

[22] Filed: Jul. 19, 1996

[51] Int. Cl.$^6$ ........................................................ F02C 9/28
[52] U.S. Cl. ........................................ 60/39.03; 60/39.281
[58] Field of Search ............................. 60/39.03, 39.091, 60/39.281

[56] References Cited

U.S. PATENT DOCUMENTS

| | | | |
|---|---|---|---|
| 4,490,791 | 12/1984 | Morrison | 364/431 |
| 4,581,889 | 4/1986 | Carpenter et al. | 60/204 |
| 4,815,928 | 3/1989 | Pineo et al. | 415/17 |
| 4,984,425 | 1/1991 | Smith | 60/39.161 |
| 5,303,545 | 4/1994 | Larkin | 60/39.281 |
| 5,596,871 | 1/1997 | Lenertz | 60/39.281 |

OTHER PUBLICATIONS

General Electric, "Aircraft Gas Turbine Guide," Apr. 1972, pp: cover, back, 1–39 to 1–49.

Traeger, "Aircraft Gas Turbine Engine Technology," 1979, pp: cover, i, ii, 211–215 and 228–232.

GE Aircraft Engines, "F414-GE-400, Low Rate Production I," Proposal 95-RNM-25, Mar. 31, 1995, cover only.

GE Aircraft Engines, "F414-GE-400, Preliminary Flight Qualification Test Phase," R95AEB004, Jul. 24, 1995, cover and p. 2, and Jul. 21, 1995 cover letter.

*Primary Examiner*—Louis J. Casaregola
*Attorney, Agent, or Firm*—Andrew C. Hess; Wayne O. Traynham

[57] ABSTRACT

A gas turbine engine includes a controller configured for controlling combustor lean flameout. The engine includes a compressor joined to a turbine by a core rotor, with a combustor disposed therebetween for receiving compressed air and fuel for generating combustion gas discharged to the turbine. The controller is configured for reducing fuel flow to the combustor in response to speed of the core rotor and pressure of compressed air entering the combustor to decelerate the core rotor while preventing lean flameout in the combustor.

16 Claims, 2 Drawing Sheets

CUMBUSTOR LEAN FLAMEOUT CONTROL

The U.S. Government has rights in this invention in accordance with Contract No. N00019-92-C-0149 awarded by the Department of Navy.

BACKGROUND OF THE INVENTION

The present invention relates generally to gas turbine engines, and, more specifically, to deceleration control thereof for avoiding lean combustor flameout.

A gas turbine engine includes a core having a compressor fixedly joined to a turbine by a core rotor extending axially therebetween. An annular combustor is disposed between the compressor and the turbine and includes fuel injectors joined to a fuel control valve which meters fuel into the combustor during operation.

The compressor includes one or more stages of circumferentially spaced apart compressor rotor blades and cooperating compressor stator vanes through which air is channeled during operation for increasing the pressure thereof. The pressurized air is discharged from the compressor and mixed with fuel in the combustor and suitably ignited for generating hot combustion gas which flows downstream therefrom and through the turbine. The turbine includes one or more stages of turbine rotor blades circumferentially spaced apart from each other, with cooperating turbine nozzle vanes for expanding the combustion gas and extracting energy therefrom.

The engine also includes a suitable controller for controlling the various components thereof over a large range of rotor speed and output power. For example, the compressor must be suitable controlled for avoiding undesirable compressor stall or surge. And, fuel flow to the combustor must also be suitable controlled for not only controlling output power, but also preventing overtemperature of the turbine which would reduce its useful life.

In a duel spool or rotor engine, an additional low pressure compressor typically known as a fan is disposed upstream of the primary compressor, known as a high pressure compressor, and is fixedly joined to a low pressure turbine disposed downstream of the primary turbine, known as the high pressure turbine, using a second rotor extending coaxially through the core engine. The engine may also include an afterburner having a variable area exhaust nozzle for providing additional thrust when desired. These various engine components are functionally interrelated which complicates the control thereof.

During deceleration of the gas turbine engine, combustor fuel flow must be reduced below that which is required to maintain steady state operation. However, the combustor requires some minimum fuel level to maintain combustion. The controller and control system must reduce fuel flow to achieve an adequate deceleration time while avoiding a lean combustor flameout. Lean combustor flameout is a relatively complex condition controlled in part by temperature, total pressure, and mass flowrate of air entering the combustor; volume of the combustor itself; and the fuel-to-air ratio within the combustor. Deceleration fuel flow is typically scheduled with parameters chosen for simplicity, which do not adequately represent actual performance at the lean blowout boundary of operation.

A conventional corrected fuel flow parameter which is generally representative of combustor fuel-to-air ratio is the product of the ratio of fuel flow mass flowrate and measured static pressure of air entering the combustor times the measured temperature of air upstream of the combustor raised to a suitable fractional exponent. The corrected fuel flow is typically scheduled with some form of core rotor speed. However core rotor speed is poorly related to combustor performance, so an additional margin must be added to the typical deceleration schedule to prevent a lean flameout. This increased deceleration time and increases the potential for a hung deceleration which are both undesirable in operation of the engine.

Many modern aircraft engines employ digital control systems which permit the use of relatively complex parameters for scheduling fuel flow over the entire operating range of the engine. However, algorithms which use many calculated or measured temperatures, pressures, and flowrates for controlling fuel flow over the operating range are complex, costly to develop, and introduce greater uncertainty in the use of many measured or calculated parameters. Accordingly, a method and control system are desired for improving accuracy of protection against lean blowout while retaining simplicity.

SUMMARY OF THE INVENTION

A gas turbine engine includes a controller configured for controlling combustor lean flameout. The engine includes a compressor joined to a turbine by a core rotor, with a combustor disposed therebetween for receiving compressed air and fuel for generating combustion gas discharged to the turbine. The controller is configured for reducing fuel flow to the combustor in response to a speed of the core rotor and pressure of compressed air entering the combustor to decelerate the core rotor while preventing lean flameout in the combustor.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
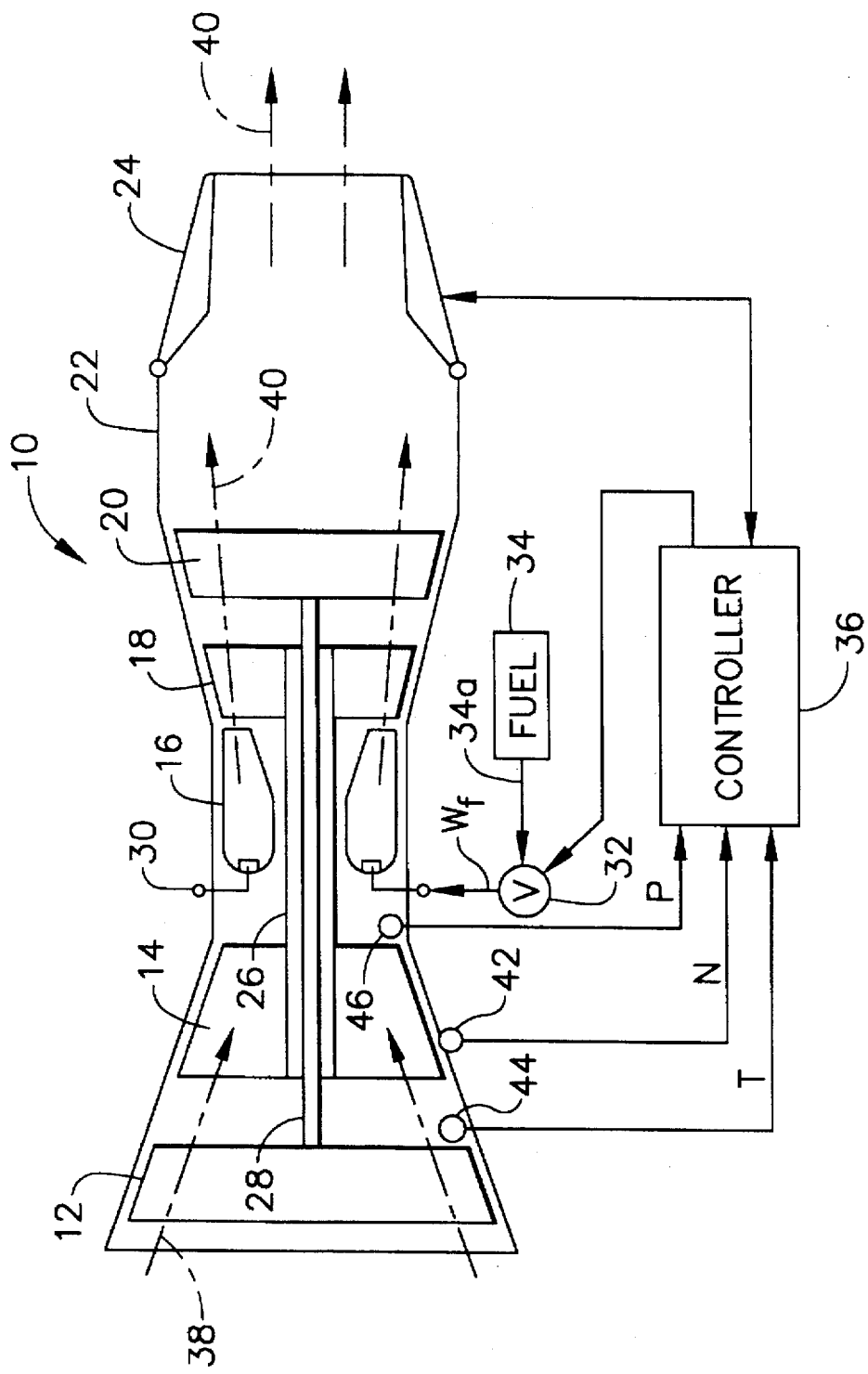
FIG. 1 is a schematic representation of an exemplary gas turbine engine including a controller configured in accordance with the present invention for preventing combustor lean flameout.

Illustrated schematically in FIG. 1 is an exemplary aircraft gas turbine engine 10 configured in accordance with an exemplary embodiment of the present invention. The engine 10 includes in serial flow communication a plurality of conventional components including a fan or low pressure compressor 12; a high pressure compressor 14; an annular combustor 16; a high pressure turbine 18 which may be a single stage for example; a low pressure turbine 20 which may also be a single state, for example; an afterburner or augmenter 22 including separate fuel injectors (not shown), and a cooperating variable area exhaust nozzle 24.

The fan 12, compressor 14, high pressure turbine 18, and low pressure turbine 20 each include respective rows of circumferentially spaced apart rotor blades and cooperating stator vanes or nozzles in a conventional configuration and cooperation. The high pressure turbine 18 is fixedly joined to the high pressure compressor 14 by a core shaft or rotor 26. And, the low pressure turbine 20 is fixedly joined to the fan 12 by a corresponding fan shaft or rotor 28.

A plurality of conventional fuel injectors 30 are mounted around the upstream inlet end of the combustor 16 and disposed in flow communication with a conventional fuel control valve 32. The valve 32 is suitably joined to a fuel tank 34 which contains fuel 34a which is suitably pressurized and provided to the valve 32 for metered flow therethrough to the injectors 30.

The engine 10 also includes a digitally programmable controller 36 which may take any conventional form, and is suitably electrically joined to the fuel valve 32 for controlling operation thereof and metering the fuel flow, designated $W_f$, into the combustor 16.

In normal operation, air 38 enters the fan 12 and is pressurized through the compressor 14, mixed with the fuel 34a in the combustor 16 and suitably ignited for generating hot combustion gas 40 which is discharged from the combustor 16 and enters the high pressure turbine 18, which extracts energy therefrom for powering the compressor 14. The combustion gas 40 in turn flows downstream through the low pressure turbine 20 which extracts additional energy therefrom for powering the fan 12. When desired, additional fuel may be introduced and ignited in the afterburner 12 for augmenting thrust from the engine 10, with the variable area exhaust nozzle 24 being suitably operatively joined to the controller 36 for varying the exhaust area thereof for use in controlling the engine 10 in a conventional manner.

Various sensors are used in the engine 10 and operatively joined to the controller 36 for controlling operation of the engine 10 in a conventional manner. For example, the engine 10 additionally includes a conventional core speed sensor 42 adjoining the core rotor 26 at any convenient location such as at the radially outer tips of the rotor blades of the compressor 14 for measuring rotational speed, designated N, of the core rotor 26 during operation. The speed sensor 42 provides a suitable electrical signal representative of core speed for use in the controller 36.

The core speed N is an actual speed, and it is conventional to correct the speed in the controller 36 for use in controlling the engine. Corrected core speed is typically accomplished by using a temperature sensor 44 suitably mounted between the fan 12 and the compressor 14 for measuring the temperature of the air 38 entering the high pressure compressor 14 and providing a corresponding electrical signal to the controller 36. The core speed N is typically corrected by dividing it by the square root of the compressor inlet temperature. The engine 10 as just described is conventional in structure, function, and operation.

As indicated above, it is desirable to configure the controller 36 for specifically controlling deceleration of the core rotor 26 to prevent lean combustor flameout with the minimum deceleration time, and while also avoiding hung decelerations. The combustor lean flameout boundary is analytically represented as a conventional curve of combustor fuel-to-air ratio versus a combustor loading parameter. One conventional representation of the loading parameter is $T*P^{1.8}*V/W$; where T, P, and W are the temperature, total pressure, and mass flowrate of air entering the combustor; V is the volume of the combustor; and the asteriks represent multiplication. The volume of the combustor is a constant and the temperature T and pressure P are typically measured in an engine, whereas the mass flowrate W is not measured in engines.

Accordingly, instead of using this optimum loading parameter in controlling combustor lean flameout, a simpler parameter such as some form of the core rotor speed N as indicated above is typically used with the attendant shortcomings described.

In accordance with the present invention, a substantially simple variation of the optimum combustor loading parameter has been discovered using proven thermodynamic relationships, and enjoys a strong correlation with the optimum loading parameter for improving combustor lean flameout control while maintaining simplicity. One form of this derived combustor loading parameter in accordance with the present invention is $N*P^y$; where N is the speed of the core rotor 26 and P is the static pressure of air entering the combustor 16.

As shown in FIG. 1, the speed sensor 42 is provided for measuring the core speed N, and a conventional pressure sensor 46 is suitably mounted between the compressor 14 and the combustor 16 for measuring static air pressure P therebetween. For example, the pressure sensor 46 may be the conventionally used sensor for measuring compressor discharge air (CDP) pressure. The derived loading parameter may be suitably scheduled within the controller 36 with the conventional corrected fuel flow parameter for reducing fuel flow to the combustor 16 in response to core speed and the pressure of the compressed air 38 entering the combustor 16 to decelerate the core rotor 26 while preventing lean flameout in the combustor 16. Scheduling of these parameters is illustrated schematically in FIGS. 2 and 3 which are readily implemented in suitable software in the programmable controller 36.

The measured core speed N and air pressure P are suitably combined in the controller 36 to obtain a corresponding measured value of the derived combustion loading parameter. The loading parameter value is then suitably compared with a predetermined schedule 48 suitably stored in conventional memory within the controller 36. The schedule 48 includes data points representing a curve 48a of the corrected fuel flow parameter versus the derived combustor loading parameter which is used to obtain a minimum value of the fuel flow $W_f$ for preventing combustor lean flameout during core rotor deceleration. The controller 36 controls the fuel valve 32 to suitably meter the minimum fuel flow $W_f$ to the combustor 16 to minimize deceleration time in decelerating the core rotor 26 without combustor lean flameout.

Figure 2:
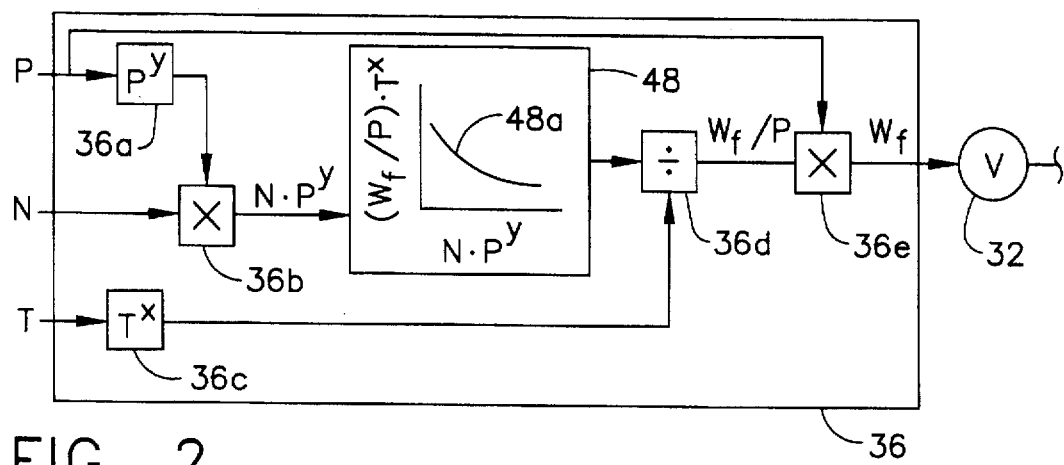
FIG. 2 is a schematic representation of a combustor lean flameout control configured in the controller illustrated in FIG. 1 for controlling fuel flow through the valve to the combustor.

Since the derived loading parameter is a product of the core speed N and a fraction or portion of the air pressure P, these measured parameters must be suitably combined in the controller 36. As shown in FIG. 2, the electrical signal received from the pressure sensor 46 representing the air pressure P is suitably raised with an exponent y in a conventional exponent function 36a of the controller and then multiplied with the electrical signal from the speed sensor 42 representative of the core speed N in a suitable multiplier function 36b to yield the measured value of the derived loading parameter $N*P^y$. This value is provided to the schedule 48 which provides a corresponding value of the corrected fuel flow parameter which controls combustor lean flameout during rotor deceleration.

The schedule 48 may be suitably generated for each particular engine design based on the specific parameters thereof for minimizing fuel flow during core rotor deceleration while preventing combustor lean flameout. The schedule 48 represents an entire locus of data points covering the entire operating range of the engine 10 where rotor deceleration must be controlled. The scheduled fuel flow in the schedule 48 is fuel flow conventionally corrected by the air pressure P entering the combustor 16 and by the temperature T of the air at any suitably location upstream of the combustor 16. The temperature exponent x may have any suitable value, and conventionally has a fractional value within the range of about 0.3–0.7.

The derived loading parameter has a fractional exponent y for the air pressure P which has a preferred value of about 0.3 as derived from thermodynamic relationships representing operation of the combustor 16. In alternate embodiments, the pressure exponent y may be varied and optimized for optimizing combustor lean flameout performance and minimizing deceleration time. Accordingly, the pressure exponent y may have any suitable value as determined for each particular engine design.

The output value of the schedule 48 is the corrected fuel flow at the specific value of the derived loading parameter represented by the measured values of core speed N and air pressure P. In order to obtain the corresponding value of minimum fuel flowrate $W_f$ therefrom, the electrical signal from the temperature sensor 44 representative of the air temperature upstream of the combustor 16 is adjusted with the same temperature exponent x used in the schedule 48 in a suitable exponent function 36c, and used to divide the output value of the schedule 48 in a suitable divider function 36d. the combination of the output of the schedule 48 and the adjusted measured air temperature $T^x$ from the divider 36d represents the ratio of the required minimum fuel flow $W_f$ over the air pressure P.

Accordingly, the signal representing the measured air pressure P is also provided without change to a suitable multiplier function 36e where it is combined with the output of the divider function 36d to provide the required value of the minimum fuel flow $W_f$, the minimum fuel flow value $W_f$ is conventionally applied to the fuel valve 32 for in turn controlling the minimum fuel flow into the combustor 16 for achieving faster core rotor deceleration while preventing lean combustor flameout.

Figure 3:
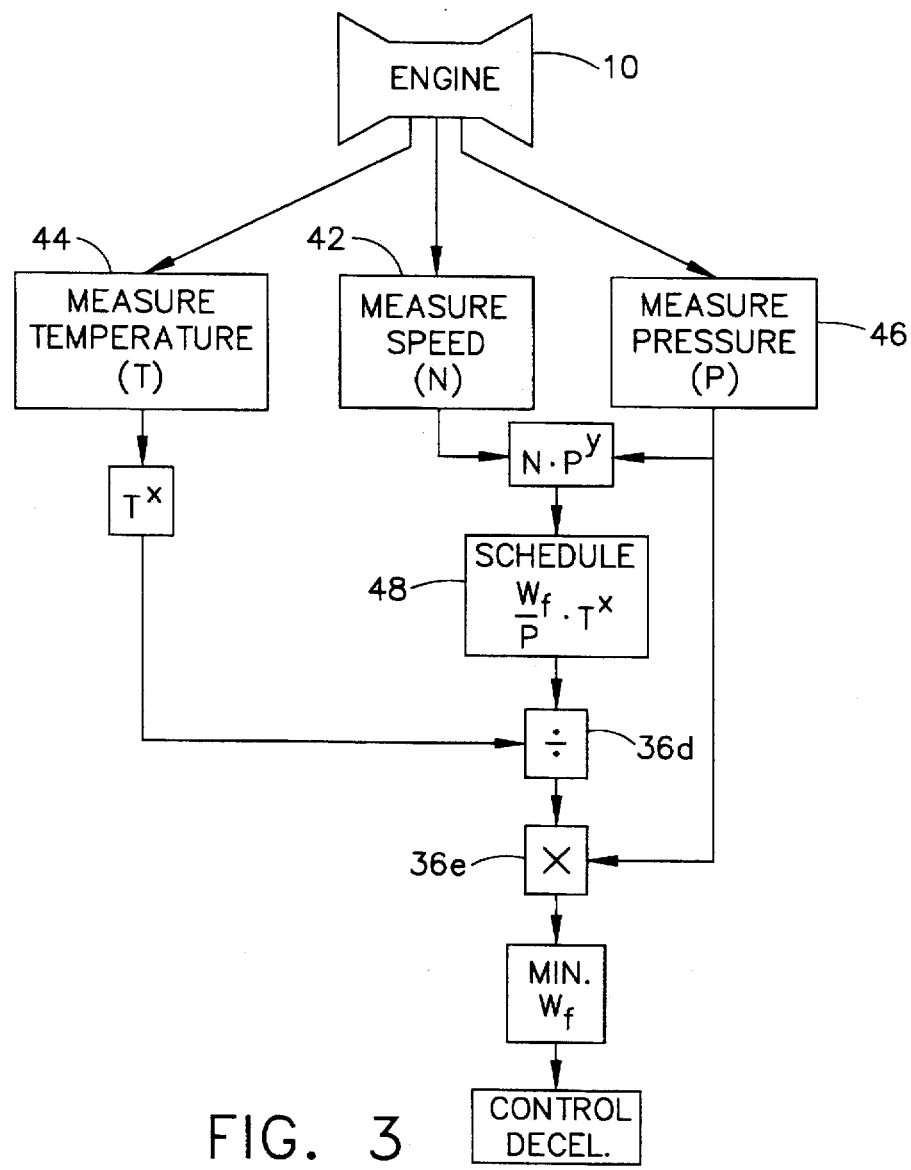
FIG. 3 is a flowchart representation of an exemplary method of implementing combustor lean flameout control in the engine illustrated in FIG. 1.

Combustor lean flameout control as represented by FIGS. 2 and 3 is a relatively simple control system which limits combustor fuel flow during decelerations to prevent lean combustor flameout in an improved method. The control is readily implemented by providing suitable software within the programmable controller 36 which uses simple parameters to more accurately represent the fuel-to-air ratio versus combustor loading parameter boundary. The schedule 48 is specifically configured to schedule the corrected fuel flow parameter versus the derived combustor loading parameter which is equivalent to controlling combustor fuel-to-air ratio versus the more complex, optimum loading parameter disclosed above.

This method of providing lean flameout control provides greater certainty in protecting against lean blowout during deceleration as compared to conventional methods based on various forms of core rotor speed. The measured parameters N, P, and T are typically available in conventional control systems, and therefore may be used in a new combination for specifically improving protection against combustor lean blowout. The derived combustor loading parameter scheduled in the schedule 48 improves lean flameout performance and therefore allows a substantial reduction in margin in the fuel flow deceleration schedule for providing faster deceleration times and reducing the potential for hung decelerations.

Although the invention is disclosed as being implemented by suitable software in the digital controller 36, it may also be implemented in hydromechanical or other electrical control systems typically used in controlling gas turbine engines. The invention may also be applied to any type of gas turbine engine having a core engine where combustor lean flameout control is desired.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A method of controlling combustor lean flameout in a gas turbine engine having a compressor joined to a turbine by a core rotor, with a combustor disposed therebetween for receiving compressed air from said compressor and fuel through a valve for providing combustion gas discharged to said turbine, comprising reducing fuel flow to said combustor in response to a combustor loading parameter including a product of speed of said core rotor and pressure of said compressed air entering said combustor to decelerate said core rotor while preventing lean flameout in said combustor.

2. A method according to claim 1 further comprising:
measuring said speed of said core rotor;
measuring said air pressure between said compressor and said combustor;
combining said measured speed and pressure to obtain a corresponding value of said combustor loading parameter;
comparing said loading parameter value with a schedule of a fuel flow parameter versus said loading parameter to obtain a minimum value of said fuel flow; and
metering said minimum fuel flow to said combustor to decelerate said core rotor without combustor lean flameout.

3. A method according to claim 2 wherein said loading parameter is a product of said core speed and a portion of said air pressure, and said combining step multiplies said measured speed with a fraction of said measured pressure.

4. A method according to claim 3 wherein said scheduled fuel flow is corrected fuel flow for representing fuel-to-air ratio.

5. A method according to claim 4 wherein said scheduled fuel flow is fuel flow corrected by said air pressure entering said combustor and by temperature of said air upstream of said combustor.

6. A method according to claim 5 further comprising:
measuring said air temperature upstream of said combustor; and
combining said measured air temperature with said scheduled fuel flow to obtain said fuel flow minimum value.

7. A method according to claim 6 wherein:
said air pressure is static pressure;
said loading parameter is the product of said core speed, and said air pressure having a pressure exponent;
said combining step multiplies said measured speed with said measured pressure having said pressure exponent;
said scheduled corrected fuel flow parameter is a product of a ratio of said fuel flow and said air pressure, times said temperature with a fractional exponent; and
said measured air temperature is correspondingly raised to said fractional exponent for combining with said schedule.

8. A method according to claim 7 wherein:

said pressure exponent is about 0.3; and said fractional temperature exponent is within a range of about 0.3–0.7.

9. A gas turbine engine comprising:

a compressor joined to a turbine by a core rotor;

a combustor disposed between said compressor and turbine for receiving compressed air from said compressor and fuel through a valve for producing combustion gas discharged to said turbine; and means for reducing fuel flow to said combustor in response to a combustor loading parameter including a product of speed of said core rotor and pressure of said compressed air entering said combustor to decelerate said core rotor while preventing lean flameout in said combustor.

10. An engine according to claim 9 further comprising:

a speed sensor for measuring said speed of said core rotor;

a pressure sensor for measuring said air pressure between said compressor and said combustor; and wherein said reducing means comprise a controller for:

combining said measured speed and pressure to obtain a corresponding value of said combustor loading parameter;

comparing said loading parameter value with a schedule of a fuel flow parameter versus said loading parameter to obtain a minimum value of said fuel flow; and metering said minimum fuel flow to said combustor to decelerate said core rotor without combustor lean flameout.

11. An engine according to claim 10 wherein said loading parameter is a product of said core speed and a portion of said air pressure, and said controller is configured for multiplying said measured speed with a fraction of said measured pressure.

12. An engine according to claim 11 wherein said scheduled fuel flow is corrected fuel flow for representing fuel-to-air ratio.

13. An engine according to claim 12 wherein said scheduled fuel flow is fuel flow corrected by said air pressure entering said combustor and by temperature of said air upstream of said combustor.

14. An engine according to claim 13 further comprising:

a temperature sensor for measuring said air temperature upstream of said combustor; and wherein said controller is configured for combining said measured air temperature with said scheduled fuel flow to obtain said fuel flow minimum value.

15. An engine according to claim 14 wherein:

said air pressure is static pressure;

said loading parameter is the product of said core speed, and said air pressure having a pressure exponent;

said controller is configured to multiplying said measured speed with said measured pressure having said pressure exponent;

said scheduled corrected fuel flow parameter is a product of a ratio of said fuel flow and said air pressure, times said temperature with a fractional exponent; and said controller is configured for correspondingly raising said measured air temperature to said fractional exponent for combining with said schedule.

16. An engine according to claim 15 wherein:

said pressure exponent is about 0.3; and said fractional temperature exponent is within a range of about 0.3–0.7.

* * * * *